Dec. 31, 1963  P. H. REDFIELD, JR  3,115,648
COMBINATION BALE HOOK ANDTWINE CUTTER
Filed Aug. 22, 1961
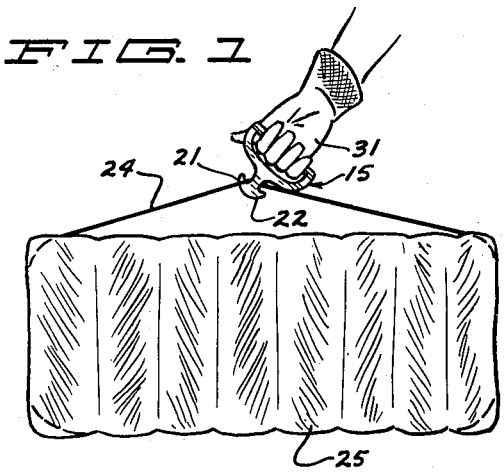
FIG. 1
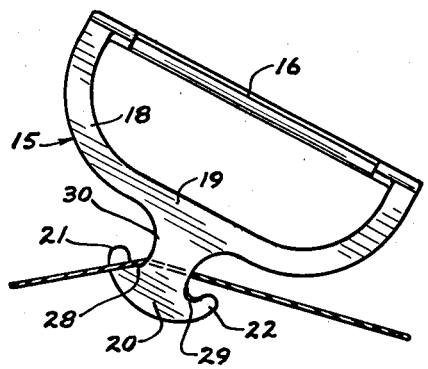
FIG. 3
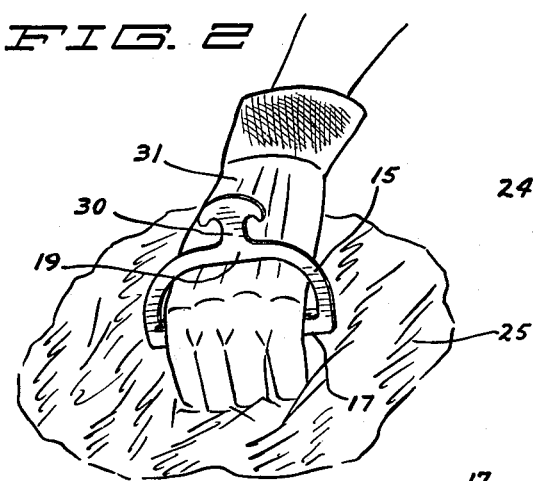
FIG. 2
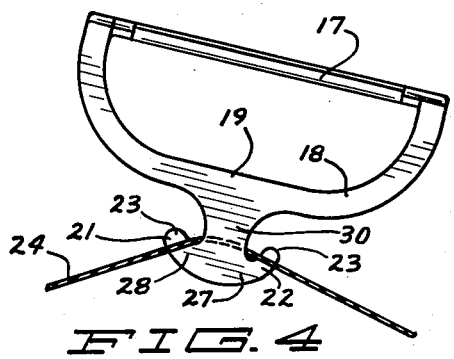
FIG. 4
FIG. 6
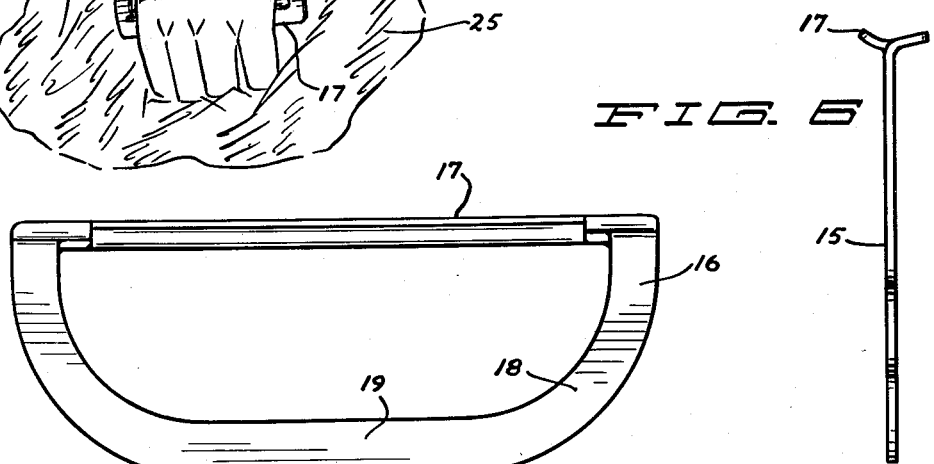
FIG. 5
INVENTOR.
PAUL H. REDFIELD
BY
Braddock and Braddock
ATTORNEYS 3,115,648
COMBINATION BALE HOOK AND TWINE CUTTER
Paul H. Redfield, Jr., R.R. 3, Madison, S. Dak.
Filed Aug. 22, 1961, Ser. No. 133,106
3 Claims. (Cl. 7—14.3)

This invention has relation to a combination tool and more particular to a combination bale hook and twine cutter that can be held in one hand, used to lift bales of material and cut twine used to bind the bales together.

The present invention discloses a device that has a handle with a double hook extending therefrom. One of the hooks has a flat lifting edge and can be placed underneath twine that is normally used to tie bales of hay or straw and used to lift the bales to move them to a feeding location. Without putting the bale down or changing the position of the hand on the handle it can be twisted so that a second hook, having a sharp cutting edge, is looped underneath the twine and the twine cut with this edge. This is done without use of the other hand. The handle is made so that when the twine has been cut the combination tool can be flipped up over the back of the hand and both hands used to separate material in the bale and feed it.

A farmer using such a combination tool can greatly speed up the feeding of baled bulk material and is not subjected to the dangers of having open knives for cutting twine nor is there any possibility of sharp cutting blades falling in the hay where it can be accidently swallowed by the cattle and cause injury.

The combination bale hook and twine cutter as shown is very simple to manufacture and consequently is low in cost. The speed of operation and safety of use make the tool a highly desired implement for farm feeding operations.

It is an object of the present invention to present a low cost, efficient and safe combination bale hook and twine cutter.

In the drawings:

FIG. 1 is a side elevational view of a bale of material showing a combination tool hook in use to lift a bale of hay;

FIG. 2 is a fragmentary perspective view of the combination tool of FIG. 1 flipped out of the way over the back of a hand so that the person using the tool can use both hands to break up the bale;

FIG. 3 is a fragmentary enlarged side elevational view of the combination bale hook and twine cutter shown in FIG. 1;

FIG. 4 is a side elevational view of the device of FIG. 3 shown in position to cut twine;

FIG. 5 is an enlarged side elevational view of the combination bale hook and twine cutter; and FIG. 6 is an end elevational view of the device of FIG. 5 as viewed from a right end thereof.

Referring to the drawings and the numerals of reference thereon, a combination bale hook and twine cutter illustrated at 15 includes a top handle portion 16 that includes a handle grip 17 for the person using the hook. The handle portion also includes a bifurcated yoke 18 that has a lower member 19 which is substantially parallel to the handle grip 16. The handle grip is integral with the upper end portion of the yoke and extends between the legs of the yoke. The lower member 19 has an integral shank 30 that supports a double hook member 20. The double hook member has a first lifting hook 21 and a second cutting hook 22. The end portions of both of the hooks, illustrated at 23, 23, are rounded so that they can be easily slipped under twine, illustrated at 24, which is used to bind a bale of hay, illustrated at 25. The end portions also curve toward the yoke to form a J shape. The first lifting hook 21 has a hook throat 28 that has flat surface on the edge thereof facing the handle and thus does not cut twine when it comes in contact therewith. This hook is used to lift the bale. A throat 27 of second hook 22 is sharpened to form a cutting edge 29 at the edge thereof facing the handle grip.

The end portions 23 of the hooks are curved toward the handle grip so that when the twine is slipped onto the hook it will not come off easily. The lifting hook can be inserted under the twine merely by driving the end 23 into the hay so the hook goes under the twine and then lifting upwardly. Once the lifting hook has been inserted the cutting hook 22 can be lowered below the twine as shown in FIG. 3 by twisting the tool slightly and then the tool can be lifted again to loop the twine over the cutting edge 29.

In operation, a combination bale hook and twine cutter will be held in a human hand, illustrated at 31, and, as shown in FIG. 1, the bale 25 will be lifted by inserting the lifting hook 21 under the twine 24 and pulling upwardly. The bale then can be carried by the operator to the desired location using only one hand. When the desired feeding location has been reached, the operator will twist the hook downwardly as shown in FIGS. 1 and 3 so that the end 23 of the cutting hook 22 is below the twine 24. Then by twisting the hook slightly in opposite direction so that the twine fits snugly around shank 30, the cutting hook 22 can be slipped under the twine lifted and the twine will come into contact with the cutting edge 29. This position for cutting is shown in FIG. 4. The operator merely lifts upwardly and the twine is cut and the hay or straw in the bale released.

As shown in FIG. 2, the operator then can flip the combination bale hook and twine cutter back up over the back of his hand so that it is completely out of the way. He then can use both hands to break up the bale and further finish the feeding operation. The yoke of the handle must be large enough to permit the operator to flip the hooks over the back of his hand in order to accomplish the desired efficient operation of the combination tool.

Through the use of such a tool the feeding of bales can be accomplished very rapidly and with great safety. The cutting edge 29 is out of the way so that the farmer or operator is not subjected to the dangers of being cut such as he would be if he used a knife. When a knife is used to cut the twine the knife has to be placed away while the farmer does the feeding or else closed and put into his pocket. With the use of the combination tool the farmer does not have to waste his time but merely flips the tool over the back of his hand as shown in FIG. 2 so that it is completely out of the way and both hands are free to be used in breaking the bale and feeding.

The lifting hook 21 is used to lift the bale by its twine and move it to its desired location. When the lifting hook is used in this manner the twine 24 is lifted away from the bale 25 to facilitate the insertion of the cutting hook 22 underneath the twine. In this way the tool hooks cooperate with each other to accomplish a result that would not be obtainable if two separate hooks would be used.

When twine is supported by the first hook and the bale is lifted the twine is under tension except for the portion thereof which is contacting the first hook. Twine, or any other material, is more easily cut while it is under tension and thus when the cutting edge contacts the twine it is more easily cut than if contacted by only the cutting hook. In addition the twine, when it is wrapped around the shank 30 crosses the cutting edge at an oblique angle, the cutting edge contacts the individual twine fibers at this angle, which further facilitates cutting of the twine, decreases wear on the cutting edge and reduces the effort necessary to cut the twine.

If two separate hooks are used the feeding operation is greatly slowed down and efficiency of the operation is sharply reduced.

While the specific embodiment shown in the drawings is the preferred way of accomplishing the desired results, it is to be understood that other variations of such a combination bale hook and twine cutter can be made without departing from the spirit of the specification or the scope of the claims that follow.

What is claimed is:

1. A combination bale hook and twine cutter including a handle member including a bifurcated yoke and a handle grip joining outer ends of said yoke, said yoke providing an opening sufficient for a hand to grasp the handle grip, a shank integral with said yoke, a first hook integral with said shank and having an outer end portion thereof curved toward said yoke, said first hook having a throat provided with a flat edge surface facing said yoke and adjacent said shank, and a second hook integral with said shank and of substantially identical configuration to said first hook, said second hook having a throat portion provided with a sharp cutting edge facing said yoke and adjacent said shank, said hook and said yoke being substantially coplanar.

2. The combination as specified in claim 1 wherein the outer end portions of said first and second hooks are rounded.

3. The combination as specified in claim 2 wherein said flat edge surface of said first hook and said cutting edge of said second hook are substantially the same distance away from said handle grip.

References Cited in the file of this patent

UNITED STATES PATENTS

| | | |
|---|---|---|
| 241,594 | Bickelhaupt | May 17, 1881 |
| 676,961 | Parks | June 25, 1901 |
| 2,702,941 | Hale | Mar. 1, 1955 |

FOREIGN PATENTS

| | | |
|---|---|---|
| 153,190 | Sweden | Jan. 24, 1956 |